H. E. GRIESHABER.
TESTING TANK FOR SUBMARINES.
APPLICATION FILED OCT. 11, 1917.
1,309,728.
Patented July 15, 1919.
2 SHEETS—SHEET 1.
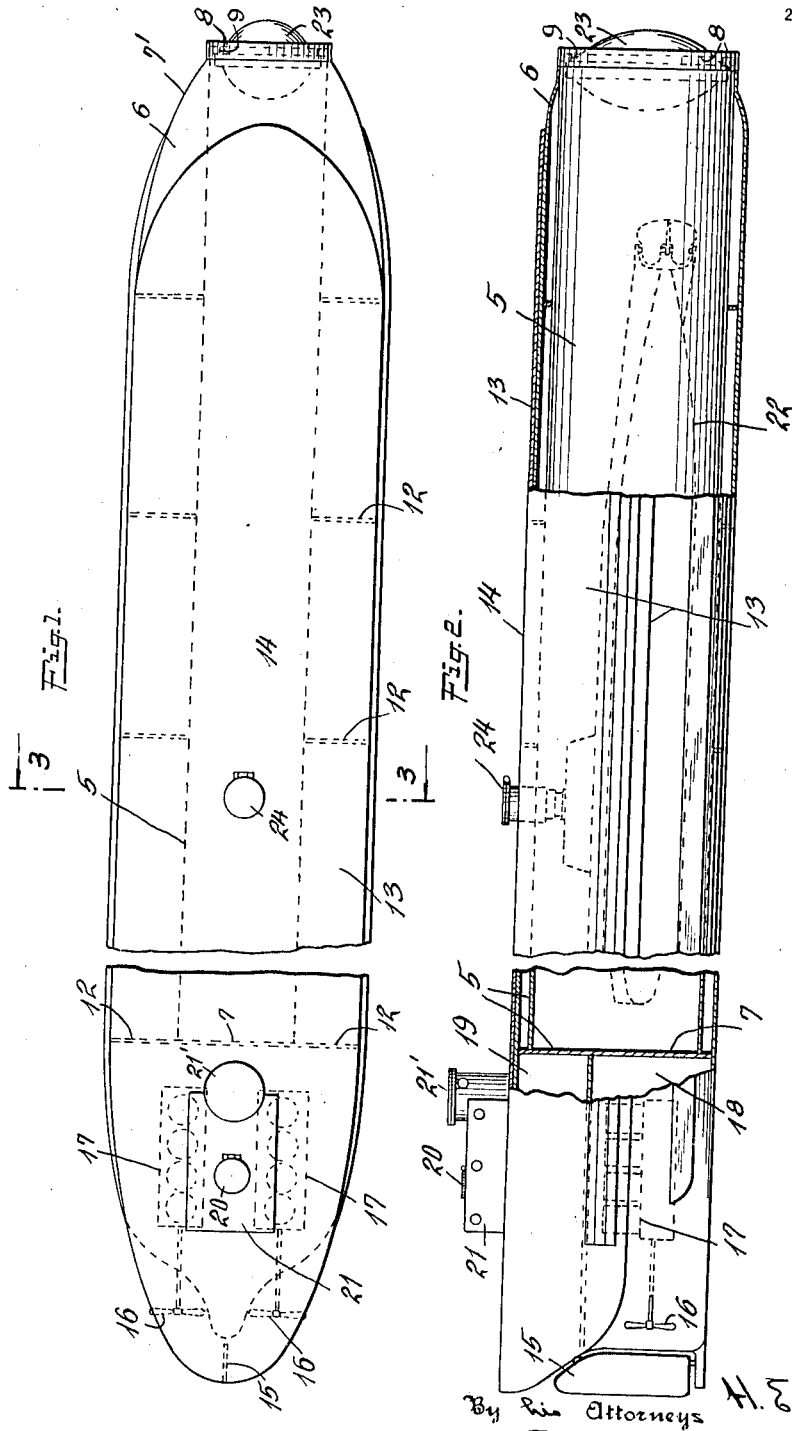

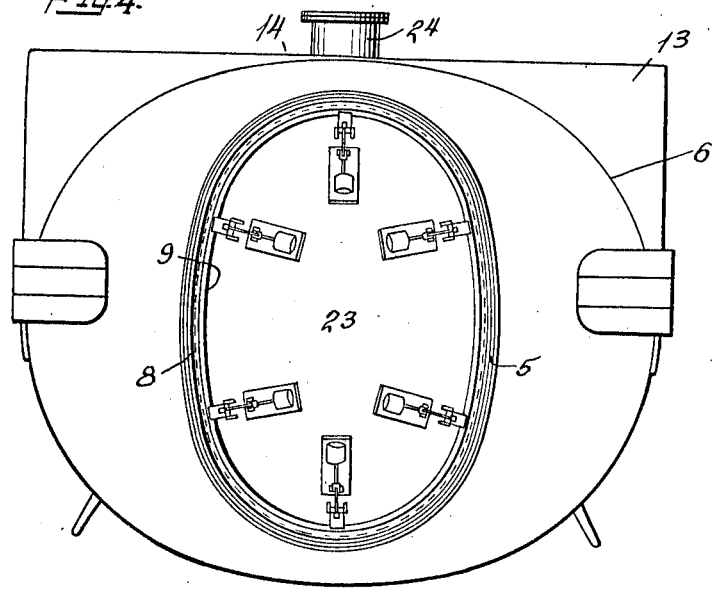
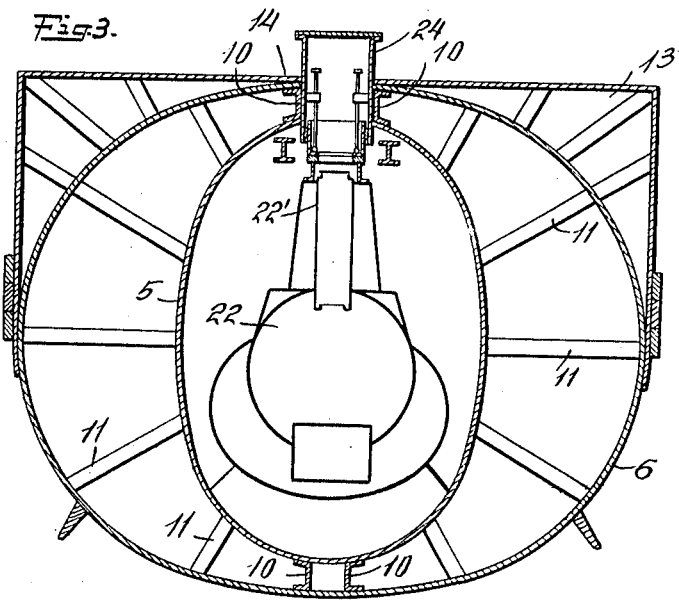

UNITED STATES PATENT OFFICE.

HUGO E. GRIESHABER, OF NEW LONDON, CONNECTICUT, ASSIGNOR TO ELECTRIC BOAT COMPANY, A CORPORATION OF NEW JERSEY.

TESTING-TANK FOR SUBMARINES.

1,309,728.

Specification of Letters Patent. Patented July 15, 1919.

Application filed October 11, 1917. Serial No. 195,886.

*To all whom it may concern:*

Be it known that I, HUGO E. GRIESHABER, residing at New London, in the county of New London, State of Connecticut, have invented certain new and useful Improvements in Testing-Tanks for Submarines; and I do hereby declare the following to be a full, clear, and exact description of the invention, such as will enable others skilled in the art to which it appertains to make and use the same.

This invention relates to the testing, inspection and repair of launched submarine boats, the principal object of the invention being to provide an improved water borne testing tank for receiving and inclosing a submarine the hull of which is to be tested. It has been proposed heretofore to provide a testing craft of this kind so constructed that it may be sealed closed after receiving a submarine boat, and equipped with suitable flooding and emptying connections whereby the water level in the tank may be varied at will and the hull structure of the contained submarine may be tested by compressed air alone or by compressed air admitted to the interior of the tank when the tank is partially or wholly flooded with water or by water pressure alone when the testing tank is wholly flooded with water. It has been suggested, also, that the testing tank be constructed as a horizontally elongated tank body having an opening at one end through which a submarine boat may pass to enter the tank body to be housed completely therein, and that a separable caisson be provided shaped to constitute a closure for the opening and provided with locking devices by which the caisson, when floated into position to close the opening, may be clamped into place to seal the opening closed in a water tight manner. In order to float the testing tank and to facilitate maneuvering the same in connection with the reception of a submarine boat the hull of which is to be tested, caissons have been permanently attached to the testing tank and subdivided into ballast and trimming tanks equipped with flooding and emptying connections.

The main object of the present invention is to provide a testing craft in which a submarine boat of a given size may be housed and tested or repaired, but so constructed that the cross sectional area of the testing tank is materially decreased and the capacity of the ballast tanks correspondingly diminished, while maintaining the seaworthy qualities of the craft. This object is attained by providing a hull construction for the testing craft comprising two tubular hulls, one within the other. The inner hull which constitutes the testing tank, is higher than it is wide, and the outer hull, which houses the ballast tanks between it and the inner hull, is wider than it is high. By this construction, when the two hulls are attached to each other adjacent to the top and bottom lines of the inner hull, they strengthen and brace each other so that the resistance of the double hull structure to bursting and crushing strains is substantially equal to the resistance of a hull of perfectly circular cross section.

In its preferred form, the testing craft will include an inner elliptical testing tank with its major axis vertical, and an outer elliptical shell with its major axis substantially horizontal. A combination of two substantially elliptical chambers in the relation disclosed will be at least as non-deformable as a single walled chamber of circular cross section. The testing tank constituted by the inner hull is of such shape that when the boat to be tested carries its conning tower the amount of fluid to be admitted to the testing tank to test the hull strength of the submarine is very much less than the amount of fluid which would have to be admitted to a testing tank of circular cross section, and consequently the ballast tanks or the like carried by the testing craft may be of reduced capacity compared to the ballast tanks which would have to be provided for sustaining a testing craft the testing tank of which is of circular cross section. Also, according to the present invention, the outer hull is spaced from the inner hull in such a way that a plurality of trimming and other ballast tanks may be disposed between the two hulls with their centers of volume so located relative to the center of volume of the testing tank that maneuvering of the testing craft is facilitated.

In the accompanying drawings, which illustrate an embodiment of the invention as at present preferred, Figure 1 is top plan view; Fig. 2 is a side elevation, partially in section; Fig. 3 is a section on line 3—3 of Fig. 1 on an enlarged scale; and Fig. 4 is a view looking toward the left of Figs. 1 and 2.

Referring to the drawing, the inner hull comprising the testing tank is indicated at 5, the outer hull being shown at 6. The after end of the testing tank is permanently closed by a wall 7, the forward end of the testing tank being joined to the forward end of the outer hull, which is faired as indicated at 7′, by means of a continuous structure 8 which surrounds the submarine ingress and egress opening 9 and to which the forward ends of the two hulls are secured.

The two hulls are connected adjacent to the top and bottom lines of the testing tank by rigid members 10, and the two hulls may be additionally braced and the whole structure strengthened by the truss elements 11. The craft is further strengthened by a suitable number of transverse bulkheads in the inter-hull space, several of which are indicated at 12, for subdividing the inter-hull space into a plurality of trimming and other ballast tanks, and also fuel tanks if desired.

A superstructure 13 extends from a point near the forward end of the testing craft and overlies the upper portion of the outer hull to provide a flat deck, the superstructure merging into the outer hull in rear of the after wall 7 of the testing tank to form a faired stern portion for the testing craft. The testing craft may carry a rudder 15 and be provided with propellers 16 adapted to be driven by engines 17 housed in an engine room compartment 18 located below a compartment 19 in the faired stern portion of the testing craft. This upper compartment 19 may be equipped as a supply, tool and machinery room, and may contain power driven pumps and other apparatus to facilitate propulsion and maneuvering of the testing craft, vary the degree of submergence of the craft, &c.

Members of the crew of the testing craft may enter the interior of the after portion of the testing craft by passing through a hatch 20 set in the roof of a deck house 21, suitable means (not shown) being provided whereby members of the crew may pass readily back and forth between the two compartments 18 and 19 and the deck house. A part of the deck house is formed as a conning tower 21′.

A submarine boat 22 is shown inclosed within the testing tank, the opening 9 in the end of the testing tank being closed by a caisson end-gate 23 and the conning tower trunk hatch 22′ of the submarine being placed in communication with a trunk hatch 24 set in the deck 14 and extended down into the interior of the testing tank. Then the fluid contents of the testing tank may be varied to apply the test pressure to the hull of the submarine, and the members of the crew of the submarine may leave the latter by way of the two trunk hatches 22′ and 24 should the hull of the submarine fail. The end-gate 23 and the trunk hatch 24 form no part of the present invention, being described in detail and claimed in a copending application, Serial No. 193,665, filed Sept. 28, 1917.

When a submarine boat has been floated into the testing tank and the end gate 23 has been secured in place, the hull strength of the submarine may be tested by flooding the interior of the testing tank with water from the ballast tanks of the testing craft, and the displacement of the testing craft will not be changed. Thereupon the test pressure may be applied by pumping into the testing tank an additional amount of water or by admitting air under pressure to the testing tank. The connections for flooding and emptying the ballast tanks and for flooding and emptying the testing tank and for varying the fluid contents of the testing tank to apply the test pressure to the hull of a submarine in the testing tank are described in said copending application, Serial No. 193,665.

The testing craft may also be used as a floating dry dock for inspecting and repairing submarines, and may proceed under its own power from point to point as required.

The testing craft may also be used as a pontoon for raising sunken submarines, by flooding the ballast tanks and testing tank and attaching the craft to the sunken submarine and then pumping or blowing out the ballast tanks and testing tank. The testing craft is large enough and strong enough to permit it to be used as a pontoon to raise any size submarine, but it will be understood that the testing craft cannot be used in this way unless the after portion of the craft, containing the compartments 18 and 19 is made strong enough to withstand the submergence pressure.

I claim:

1. A testing craft comprising an inner hull of substantially elliptical cross section with its major axis vertical and of requisite dimensions to house a submarine boat, and an outer hull embracing the inner hull and being fastened thereto to strengthen it.

2. A testing craft comprising an inner hull of requisite dimensions to house a submarine boat, and an outer hull of substantially elliptical cross section with its major axis horizontal, the outer hull being fastened to the inner hull to strengthen it.

3. A testing craft comprising an inner hull of substantially elliptical cross section with its major axis vertical and of requisite dimensions to house a submarine boat, and an outer hull of substantially elliptical cross section with its major axis horizontal, the outer hull being attached to the inner hull to strengthen it.

4. A testing craft comprising an inner hull of substantially elliptical cross section with its major axis vertical and of requisite dimensions to house a submarine boat, and an outer hull of substantially elliptical cross section with its major axis horizontal, the outer hull being attached to the inner hull adjacent the top and bottom thereof.

In testimony whereof I affix my signature.

HUGO E. GRIESHABER.

Copies of this patent may be obtained for five cents each, by addressing the "Commissioner of Patents, Washington, D. C."